(12) United States Patent
Patsch et al.

(10) Patent No.: US 6,672,854 B2
(45) Date of Patent: Jan. 6, 2004

(54) TOOTH SET FOR A HYDRAULIC MACHINE

(75) Inventors: Axel Patsch, Delmenhorst (DE); Tage Christiansen, Nordborg (DE); Hans Christian Petersen, Nordborg (DE); Jørgen Pedersen, Broager (DE)

(73) Assignee: Sauer-Danfoss Holding A/S (DK)

( * ) Notice: Subject to any disclaimer, the term of this patent is extended or adjusted under 35 U.S.C. 154(b) by 0 days.

(21) Appl. No.: 10/149,882

(22) PCT Filed: Dec. 20, 2000

(86) PCT No.: PCT/DK00/00716

§ 371 (c)(1),
(2), (4) Date: Jun. 14, 2002

(87) PCT Pub. No.: WO01/48354

PCT Pub. Date: Jul. 5, 2001

(65) Prior Publication Data

US 2002/0192098 A1 Dec. 19, 2002

(30) Foreign Application Priority Data

Dec. 23, 1999 (DE) .......................................... 199 62 802

(51) Int. Cl.⁷ ................................................. F01C 1/10
(52) U.S. Cl. ......................................... 418/171; 418/178
(58) Field of Search .................................. 418/171, 166, 418/178

(56) References Cited

U.S. PATENT DOCUMENTS

| 2,233,551 A | | 3/1941 | Ott |
| 2,634,582 A | * | 4/1953 | Klatte et al. ................ 418/171 |
| 2,753,810 A | | 7/1956 | Quintilian |
| 3,126,755 A | | 3/1964 | Lock |
| 3,289,602 A | | 12/1966 | Hudgens |

FOREIGN PATENT DOCUMENTS

| DE | 1 004 624 | | 3/1957 | |
| GB | 2232444 A | * | 12/1990 | ............. F01C/1/10 |
| JP | 01012087 A | * | 1/1989 | ............. F04C/2/10 |

* cited by examiner

Primary Examiner—Thomas Denion
Assistant Examiner—Theresa Trieu

(57) ABSTRACT

The invention concerns a tooth set for a hydraulic machine, particularly a steering unit, with a toothed ring, having teeth, which are formed by means of inserts arranged in a housing, and a gear wheel arranged inside the toothed ring. It is endeavoured to simplify the production of such a tooth set. For this purpose, each inset (10) has, at least at its ends, a plate-like shape and the ends are fixed in the housing (11) in corresponding slots (17, 18).

14 Claims, 3 Drawing Sheets

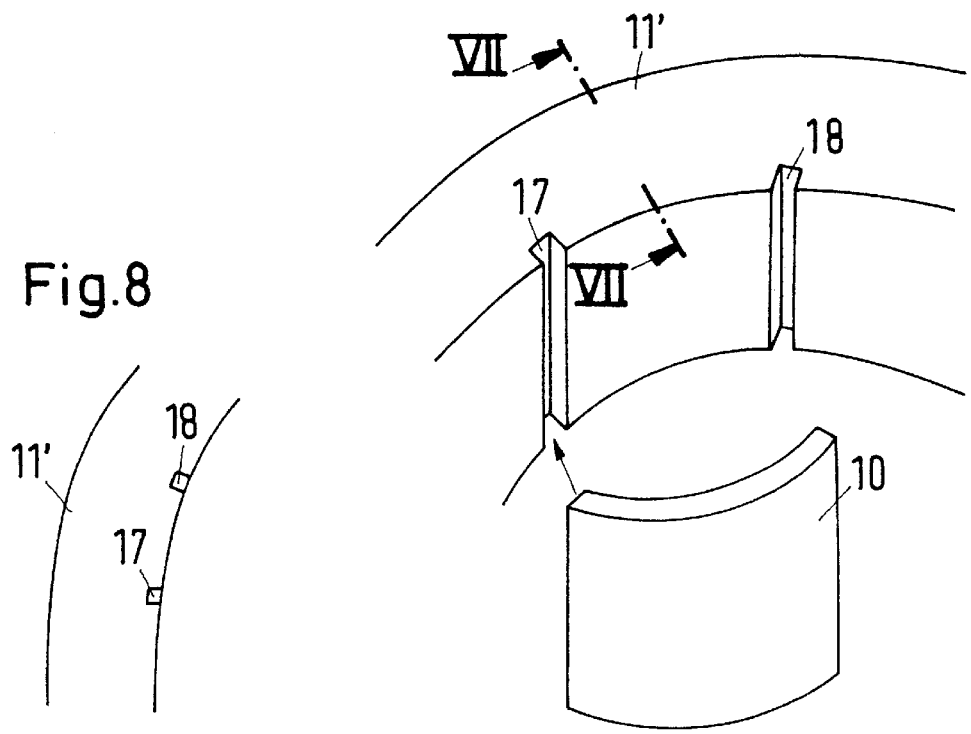
Fig.6
Fig.8
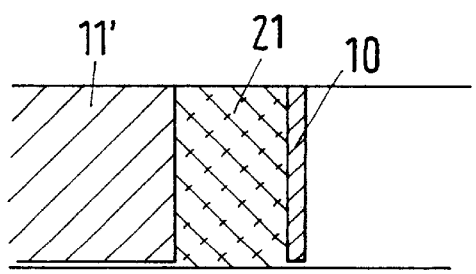
Fig.7

TOOTH SET FOR A HYDRAULIC MACHINE

BACKGROUND OF THE INVENTION

The invention concerns a tooth set for a hydraulic machine, particularly a steering unit, with a toothed ring, having teeth, which are formed by means of inserts arranged in a housing, and a gear wheel arranged inside the toothed ring.

Such a machine is known from U.S. Pat. No. 3,289,602.

In the following, the invention is described on the basis of so-called "orbit" machines, in which the gear wheel has one tooth less than the toothed ring and the gear wheel orbits and rotates in the toothed ring. This movement causes the teeth of the gear wheel and the teeth of the toothed ring to form limitation spots for individual pressure pockets, each pressure pocket being alternatingly exposed to pressure and relieved during motor operation. During motor operation the situation is directly reversed: Pressure pockets with a volume, which is reduced at a further movement of the gear wheel, are connected with a pressure connection, whereas pressure pockets, whose volume increases at the further movement, are connected with a suction connection. The efficiency of such machines is determined by, among other things, the inner tightness, that is, by the reliability, with which the individual pressure chambers are sealed against each other at the contact spots of the teeth of gear wheel and toothed ring. The same problems also apply for other tooth sets for hydraulic machines, in which a sealing between pressure chambers is also required, for example gerotor machines.

The tightness can be improved in that very narrow fits are provided between the toothed ring and the gear wheel. However, this causes that the frictional losses get very high, and that a substantial wear occurs. Additionally, the production of such tooth sets is relatively expensive.

Thus, it is proposed in U.S. Pat. No. 3,289,602, mentioned in the introduction, to form the teeth of the toothed ring from small tubes, which are supported in corresponding bores in the housing. In this connection, the tubes, or at least their surfaces, can be made of a very hard material, while the housing can be made of a softer material, which is consequently cheaper to work. In an alternative embodiment the tubes are replaced by cross-sectionally square bars, which are rounded in the area of the teeth and supported in the housing with a play, so that their angle position in relation to the gear wheel changes in dependence of the actually ruling forces. The same adjustment opportunity is also available for the tubes.

SUMMARY OF THE INVENTION

The invention is based on the task of simplifying the production of a tooth set.

With a tooth set as mentioned in the introduction, this task is solved in that at least at its ends each insert has a plate-like shape and that the ends are fixed in the housing in corresponding slots.

This embodiment has the advantage that the inserts can be substantially simplified, and still be retained reliably in the housing. The material of the inserts and the material of the housing can be chosen independently of each other, the material of the inserts being chosen with a view to wear resistance and a good cooperation with the teeth of the gear wheel. The housing only has to be stable enough to stand the ruling pressures. A resistance towards the wear of the gear wheel, however, is no longer required. As now, the efforts can be concentrated on inserts, on which the "bearing surface", that is, the area along which the teeth of the gear wheel are rubbing, is clearly defined and thus limited, the cost for the material will be kept low. The plate-like shape of the ends gives surface sections, through which the inserts are retained radially and in the circumferential direction, without requiring an expensive working of the housing.

Preferably, the insert is made of a bent plate. Such a plate is easily produced, and in this connection the term "bent" refers to the final state, that is, the curve shape can also be made in other ways than by means of the production process of bending. Through a bending process, however, the insert can be provided with a certain pretension, so that a certain internal tension helps retaining it in the slots in the housing.

Preferably, the insert is made of spring steel. Spring steel is a relatively hard material, so that the "teeth" or the wearing surfaces of the teeth consist of a correspondingly resistant material. Spring steel is a relatively inexpensive material. The surface of spring steel needs practically no further working, like for example a hardening, which simplifies the production further.

Advantageously, the slots are directed so that they form a predetermined angle to the radial direction. Thus, the slots can be inclined somewhat in the tangential direction, so that the insertion of the plate-like ends is facilitated. For example, the slots can have a direction, which corresponds to the tangent of a circularly bent tooth in the spot, where the insert projects into the housing.

Preferably, at each insert the housing has a radially inward projecting boss, which fills a space surrounded by the bent plate. Thus, the housing supports the tooth, that is, the bent plate. Or, to put it simply, the tooth is still formed by the housing, the bearing surface being covered by the insert. Thus, the toothed ring can be produced very accurately, without requiring the use of expensive materials. However, a very good wear resistance is still obtained.

In an alternative embodiment a gap may exist between the bent plate and the housing. No longer being supported by the housing, the bent plate is therefore a little flexible. This gives each tooth a small flexibility or elasticity, so that a pairing grinding, which is used for almost all tooth sets today, can be avoided. The flexibility of such a tooth is extremely small. At the highest, it is in the $\mu$m-area. However, it is sufficient to permit a substantial reduction of the accuracy of the fit between gear wheel and toothed ring.

Preferably, the housing-side limiting wall of the gap is formed by a circumferential cylinder surface, whose diameter corresponds to the inner diameter of the housing. Additionally to the flexibility or elasticity of the tooth, this gives an additional production advantage. The housing can be made as a simple cylinder ring, which is very easily produced, for example by turning. The slots for adopting the insert merely have to be made in the inside of this cylinder ring.

Preferably, the gap is filled with a compressible material. Such a material can, for example, be rubber or another elastomer material. Thus, on the one hand, the resilience of the tooth is maintained. On the other hand, however, the tooth is in some way supported from the inside. Additionally, this embodiment has the advantage that the insert can be prestressed from the inside, that is, from the housing, so that the insert is held firmly in the housing already then, when the gear wheel is not yet mounted.

In an alternative embodiment, the insert can be made of a profile, whose cross section is formed by the combination of a circle section and an oppositely bent rib, which projects sideward over the circle section. In this case, the plate-like embodiment of the insert can only be recognised at its ends in the circumferential direction. Otherwise, the insert is again a massive or, if desired, also a grooved body, at least a body, which obtains a three-dimensional extension not only through bending. However, also here the plate-like ends serve as holders for the teeth in the housing. Such inserts are also relatively easy to produce. For example, such inserts can be cut off from a profile. The inserts can be made of steel. Here, an additional advantage of these and the above-mentioned inserts appears. The simple change of the length, which must be made simultaneously with a change of the axial length of housing and gear wheel, the output of the tooth set can be changed.

In this connection, it is preferred that the surface of the circle section is hardened. The other parts of the insert can remain unhardened. This embodiment firstly simplifies the production and secondly improves the operating behaviour.

Preferably, the inserts project axially over the front side on at least one front side, and the front side is covered by a plate, which has openings corresponding to the inserts. Thus, the front side sealing between the teeth of the toothed ring is displaced from the contact surface between the plate and the toothed ring into the inside of the plate. This gives substantial advantages. Thus, it is no longer necessary for the inserts to be plane parallel with the front side of the housing after mounting. Accordingly, a working with this purpose can be avoided. In the area of the teeth of the toothed ring, the tooth set is still "tight", when, for example, the corresponding front side of the insert forms a small angle with the surface, or the insert has a certain roughness on the surface. Accordingly, the inserts can simply be cut off from a straight profile, for example by means of sawing. Thus, the inserts are already usable. A sealing is much more easily procured with an inserted part than with a merely bearing part.

In this connection it is preferred that the depth of the openings is larger than the projecting of the inserts. Thus, also the accuracy when cutting off and mounting the inserts can be reduced.

Preferably, in relation to the bearing surface, the housing is made of a soft material. A soft material is easier to work. It is usually cheaper. It only has to be sufficiently pressure resistant to adopt the pressures occurring during operation. There are no further requirements. Such a pressure resistance can, for example, be obtained in that on its radial outside the housing is wound with tightening straps, for example, fibre-reinforced tightening straps.

In a particularly preferred embodiment, it is provided that the surface of the teeth is smoothened in parallel to the movement direction of the gear wheel. Such an embodiment is only possible through the use of separate teeth in the toothed ring, as here the smoothing tool can be applied so that the smoothing tracks extend in the same direction, in which later also the gear wheel will pass the bearing surface of the individual teeth. In toothed rings, which are made in one piece, the smoothing tracks always extend perpendicularly to this direction, which gives noise during operation, which is to some extent disturbing.

BRIEF DESCRIPTION OF THE DRAWINGS

In the following, the invention is described in detail on the basis of preferred embodiments in connection with the drawings, showing.

DETAILED DESCRIPTION OF THE INVENTION

Figure 1:
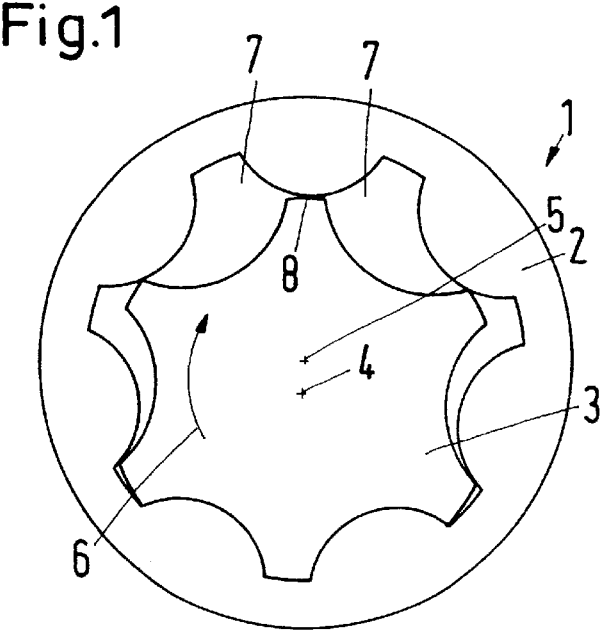
FIG. 1 a schematic view of a tooth set
FIG. 2 a section of a toothed ring of the tooth set
FIG. 3 a perspective view of a tooth according to FIG. 2
FIG. 4 a section IV—IV according to FIG. 3
FIG. 5 a top-view of the tooth
FIG. 6 a perspective view of a modified embodiment
FIG. 7 a section VII—VII according to FIG. 6
FIG. 8 a top view of a tooth according to FIG. 6
FIG. 9 a further embodiment

FIG. 1 shows a tooth set 1 with a toothed ring 2 and a gear wheel 3. The gear wheel 3 has one tooth less than the toothed ring 2. The centre 4 of the gear wheel 3 is offset in relation to the centre 5 of the toothed ring, so that the gear wheel 3, when rotating in the direction of the arrow 6, rotates and orbits in the toothed ring. Such a tooth set can be used either as a pump or as a motor. In this connection, pressure pockets 7 are formed between the gear wheel 3 and the toothed ring 2, which pressure pockets 7 are either pressurised or released in dependence of the desired function. Such tooth sets 1 are commonly known. For further information, see, for example, U.S. Pat. No. 3,289,602.

Neighbouring pressure pockets 7 are sealed against each other via a contact point 8 between the toothed ring 2 and the gear wheel 3. This requires that the gear wheel 3 bears on the toothed ring with a certain pressure. Of course, an embodiment like this causes a certain wear, which reduces the life, when no counter-measures are taken. Such a counter-measure, which is easily realised, is explained in the following.

Figure 2:
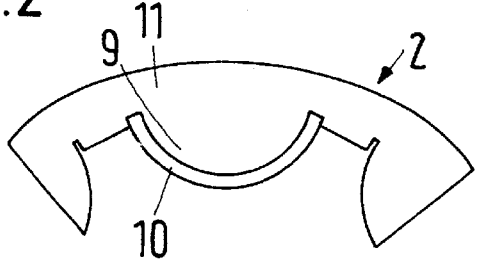

FIG. 2 shows a section of the toothed ring 2 with a tooth 9, which is covered on the surface facing the gear wheel 3, not shown in detail, with an insert 10 of spring steel. This insert 10 is inserted in a housing 11, as shown in the FIGS. 3 to 5. Thus, the housing can be made of a relatively soft material, for example aluminium. Such a material is easy to work. If the hydraulic pressures should make it necessary, the housing 11 can be reinforced from the outside by means of tightening straps, for example fibre-reinforced straps or straps of spring steel. Otherwise, the housing 11 can be relatively "thin", that is, have a relatively small radial extension.

Spring steel, on the other hand, is a relatively hard material, which only shows small signs of wear, even with a heavy friction. The surfaces of spring steel almost need no further treatment. Particularly, in most cases, a hardening is not required. Normally, the surface of the spring steel insert 10 only has to be smoothed. However, in this connection, the smoothing tracks can have a direction causing them to be parallel to the sliding or movement direction of the gear wheel 3 across the insert 10, that is, substantially in the circumferential direction. The smoothing and polishing, if any, can be made for as long as the insert 10 is still outside the housing 11. The insert 10 can be smoothed and perhaps polished already when the spring steel has not yet been bent. A smoothing and polishing can, however, also be made without problems in the bent state.

Figure 3:
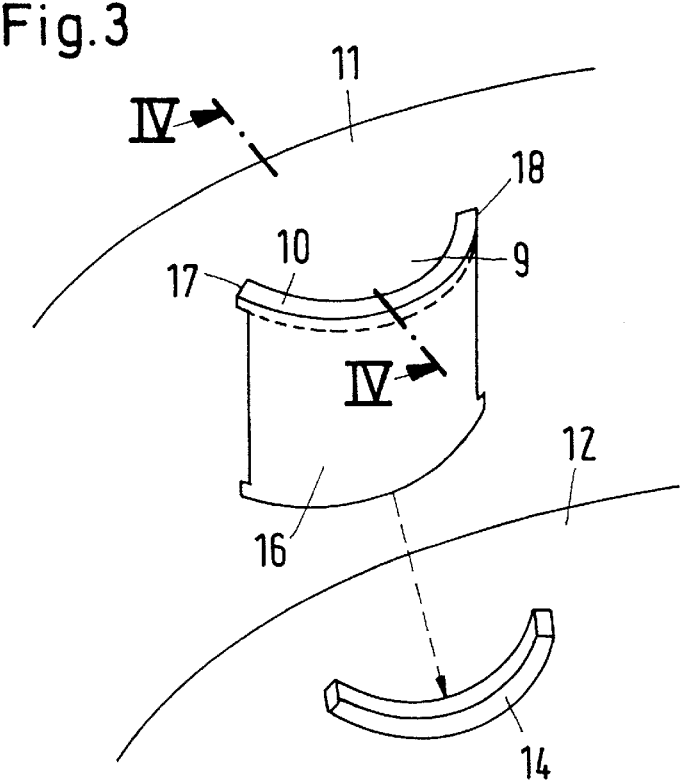
Figure 4:
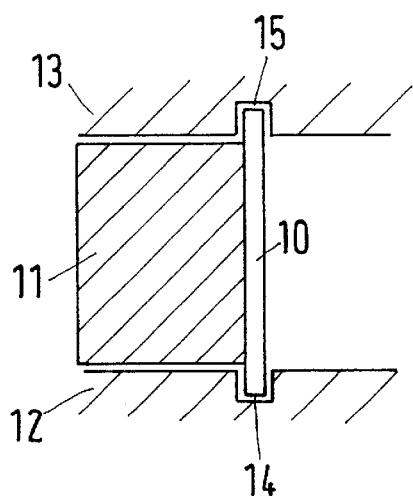
Figure 5:
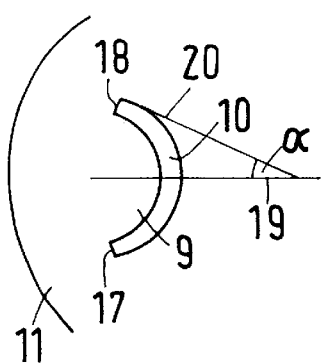

FIG. 3 shows the tooth 9 in the housing 11 in a perspective view. From this it can be seen that the insert 10 projects in the radial direction over the front side of the housing 11. This is also shown in FIG. 4. A cover 12, 13 then has a corresponding opening 14, 15, that is, a groove extending in a curve-shape, in which the projection of the insert 10 can engage. For reasons of clarification, FIG. 4 shows the housing 11 and the covers 12, 13 and the insert 10, respectively, with distances between them. These distances do not exist in reality. On the contrary, the individual parts fit each other "seamlessly". One exception from this is that the depth of the grooves 14, 15 is larger than the projection of the insert 10 over the housing 11. Therefore, the insert 10 can simply be cut off to the desired length from a spring steel profile, in the most simple case even from a spring steel band. In this connection, the required accuracy only plays a minor part, as long as it is ensured that the insert 10 goes deep enough into the plates 12, 13 to provide the corresponding sealing. Particularly, the front sides of the insert 10 no longer have to end together with the front side of the housing 11 or to be smoothed to be plane parallel to the front side of the housing 11. On the contrary, the sealing appears on bearing surface 16 of the insert 10.

For the adoption of the insert 10, the housing has slots 17, 18 in the circumferential direction on both sides of the tooth 9, the insert 10 being inserted in said slots. Expediently, the insert is inserted in the slots 17, 18 in the axial direction, which simplifies the production substantially. However, in connection with the mounting, it is also possible to bend the insert 10 more than required and then to insert it in the slots 17, 18. The insert 10 is then held in the housing with a certain prestress. The inserts 10 can also be poured in. The slots 17, 18 are not directed exactly to the radial direction, but enclose an angle α with this radial direction. Thus, they have a small component in the circumferential direction. An extension 20 of one wall of the slot 18 corresponds to the tangent of the insert, where the insert 10 goes into the housing 11.

As stated above, the insert 10 can be made by bending a spring steel band. However, it is also possible to use a profile, which is already curved, from which the corresponding inserts 10 are cut off. Preferably, the bearing surface 16 of the insert 10 should correspond to a section of an outer cylinder surface, at least in the area in which later a contact with the teeth of the gear wheel 3 will take place.

The FIGS. 6 to 8 show a modified embodiment. While in the embodiment according to the FIGS. 3 to 5 the housing 11 is made as an annulus with radially inward projecting teeth 9, the housing 11' has no teeth. Otherwise, the embodiment of the insert 10 is unchanged. The insert 10 is still inserted in the slots 17, 18. However, the production of the housing 11' is substantially simplified. An annulus with the desired radial thickness can simply be produce and inserted in the slots 17, 18. Thus, the housing 11' is ready to receive the insert 10. As shown in FIG. 7, it is possible, in this case, for the insert 10 to have the same axial extension than the housing 11' (which is also possible in the embodiment according to FIGS. 3 to 5).

Between the housing 11' and the insert 10 there is a hollow space. This hollow space can be left open. However, it can also, as shown in FIG. 7, be filled with a compressible material for example rubber or another elastomer. In both cases, the flexibility or elasticity of the tooth formed by the insert 10 is increased. Also when the movements made possible by this are only in the μm range, this embodiment with reduced accuracy provides a substantially improved fit. In particular, the pairing smoothing of gear wheel 3 and toothed ring 2 can be avoided.

In the embodiments in FIGS. 2 to 8 the insert 10 is simply a bent plate, which is inserted in the slots 17, 18. The plate can also be made of an originally smooth or flat material.

Figure 9:
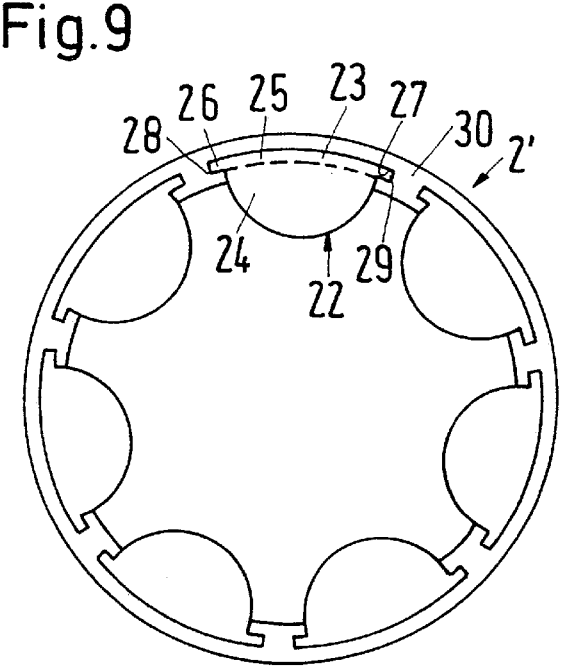

FIG. 9 shows a modified embodiment of a toothed ring 3' with inserts 22, having in advance a three-dimensional shape. These inserts can, for example, be cut off from a corresponding profile. From a cross-sectional view, this shape is formed by a bent plate 23 and a cylinder section 24, the separating line 25 between these two components being, however, only fictive or imagined. The ends 26, 27 of the plate 23 are fixed in corresponding slots 28, 29 in the housing 30. In this case, the housing 30 can be made, for example, by sintering, to create the slots 28, 29. However, it is also possible to cast the housing around the inserts 23.

The inserts 22 can also be made of steel, particularly spring steel. Also their surfaces can be smoothed accordingly.

What is claimed is:

1. A tooth set for a hydraulic machine having a steering unit, and with a toothed ring having teeth, which are formed by inserts having ends arranged in a housing, and a gear wheel arranged inside the toothed ring, characterised in that at least the ends (26, 27) of each insert (10, 22) having a plate-like shape with the ends (26, 27) being fixed in corresponding slots (17, 18; 28, 29) in the housing (11, 11', 30).

2. A tooth set according to claim 1, characterised in that the insert (10) is made of a bent plate.

3. A tooth set according to claim 2, characterised in that at each insert the housing (11) has a radially inward projecting boss (9), which fills a space surrounded by the bent plate (10).

4. A tooth set according to claim 2, characterised in that a gap exists between the bent plate (10) and the housing (11').

5. A tooth set according to claim 4, characterised in that a housing-side limiting wall of the gap is formed by a circumferential cylinder surface, whose diameter corresponds to an inner diameter of the housing (11').

6. A tooth set according to claim 4, characterised in that the gap is filled with a compressible material (21).

7. A tooth set according to claim 1, characterised in that the insert (10, 22) is made of spring steel.

8. A tooth set according to claim 1, characterised in that the slots (17, 18; 28, 29) are directed so that they form a predetermined angle to the radial direction (19).

9. A tooth set according to claim 1, characterised in that the insert (22) is made of a profile, whose cross section is formed by the combination of a circle section (24) and an oppositely bent rid (23), which projects sideward over the circle section (24).

10. A tooth set according to claim 9, characterised in that the surface of the circle section (24) is hardened.

11. A tooth set according to claim 1, characterised in that the inserts (10, 22) project axially over a front side of the inserts, and the front side is covered by a plate (12, 13), which has openings (14, 15) corresponding to the inserts.

12. A tooth set according to claim 11, characterised in that the depth of the openings (14, 15) is larger than the projecting of the inserts (10).

13. A tooth set according to claim 1, characterised in that in relation to the bearing surface (16), the housing (11, 11') is made of a soft material.

14. A tooth set according to claim 1, characterised in that the surface of the teeth is smoothened in parallel to the movement direction of the gear wheel (3).

* * * * *